United States Patent [19]

Adham

[11] Patent Number: 5,668,817
[45] Date of Patent: Sep. 16, 1997

[54] SELF-TESTABLE DIGITAL SIGNAL PROCESSOR AND METHOD FOR SELF-TESTING OF INTEGRATING CIRCUITS INCLUDING DSP DATA PATHS

[75] Inventor: Saman M. I. Adham, Kanata, Canada

[73] Assignee: Northern Telecom Limited, Montreal, Canada

[21] Appl. No.: 680,314

[22] Filed: Jul. 11, 1996

[51] Int. Cl.$^6$ ................................................ G06F 11/00
[52] U.S. Cl. ................................ 371/22.4; 395/183.06
[58] Field of Search ............................ 371/22.4, 22.1, 371/22.5, 22.6, 27; 345/183.06

[56] References Cited

U.S. PATENT DOCUMENTS

| | | | |
|---|---|---|---|
| 4,969,148 | 11/1990 | Nadeau-Dostie et al. | 371/21.1 |
| 5,313,469 | 5/1994 | Adham et al. | 371/22.1 |
| 5,349,587 | 9/1994 | Nadeau-Dostie et al. | 371/22.3 |

OTHER PUBLICATIONS

P.H. Bardell et al, in "Built-In Test for VLSI: Pseudorandom Techniques" John Wiley & Sons, 1987.

Jos van Sas et al, in "Optimized BIST Strategies for Programmable Data Paths Based on Cellular Automata", in Proc. Intl. Test Conf., 1992, pp. 110–119.

B. Koenmann et al, in "Built-In Logic Block Observation Techniques", in Proc. Intl. Test Conf., 1979, pp. 37–41.

B. Nadeau-Dostie et al, in "ScanBist: A Multi-frequency Scan-Based BIST Method", Proc. Intl. Test Conf., Sep. 1991, pp. 506–513.

S. Gupta et al, in "Test Pattern Generation Based On Arithmetic Operations", Proc. Intl. Conf. on CAD, 1994, pp. 117–124.

J. Rajski, et al, in "Accumulator-Based Compaction of Test Responses", IEEE Trans. on Computers, vol. C–42, No. 6, pp. 643–650, 1993.

J. Rajski et al, in "Test Responses Compaction in Accumulators with Rotate Carry Adders", IEEE Trans. on CAD of IC, vol. CAD–12, No. 4, Apr. 1993, pp. 531–539.

S. Adham et al, in "Arithmetic Built–In Self Test for Digital Signal Processing Architectures", in Proc. Custom Integrated Circuits Conf., 1995.

*Primary Examiner*—Vincent P. Canney
*Attorney, Agent, or Firm*—Angela C. de Wilton

[57] ABSTRACT

A self-testable Digital Signal Processing (DSP) integrated circuit is described, using a Built-In Self Test (BIST) scheme suitable for high performance DSP datapaths. The BIST session is controlled via hardware without the need for a separate test pattern generation register or test program storage. Furthermore, the BIST scenario is appropriately set-up so as to also test the register file as well as the shift and truncation logic in the datapath. The use of DataPath-BIST enables a very high speed test (one test vector is applied per clock cycle) with no performance degradation and little area overhead for the hardware test control. Comparison between DP-BIST and scan-based BIST technique is also presented. DP-BIST is used a centralized test resource to test other macros on the chip and the integration of DP-BIST with internal scan and boundary scan is addressed.

20 Claims, 5 Drawing Sheets

SELF-TESTABLE DIGITAL SIGNAL PROCESSOR AND METHOD FOR SELF-TESTING OF INTEGRATING CIRCUITS INCLUDING DSP DATA PATHS

FIELD OF THE INVENTION

The present invention relates to Built-in-Self-Testing (BIST) of integrated circuits, and more particularly to a self-testable digital Signal processor and methods for self-testing of digital signal processing (DSP) data paths in integrated circuits.

BACKGROUND OF THE INVENTION

Digital integrated circuits constructed according to conventional Built-in-Self-Test (BIST) architectures comprise dedicated test circuitry in addition to operational circuitry required to perform specific functions of the integrated circuits for their intended applications. The dedicated test circuitry usually includes test pattern generators for generating test patterns, test response compactors for compressing results of test pattern application to operational circuitry, and multiplexors to switch between normal operating configurations and test configurations. The dedicated test circuitry adds substantial hardware overhead, and the introduction of multiplexors into signal paths used during normal operation of the integrated circuits can degrade normal operation of the integrated circuit.

Nevertheless with the increasing complexity of integrated circuits, coupled with stringent quality requirements, Built-In Self Test (BIST) schemes are often the only practical test strategy. Traditional BIST methods treat the test function as independent and orthogonal to the system function and require the addition of distinct hardware structures to the integrated circuit to perform test pattern generation and test response compaction. For example, the additional test pattern generation hardware may include linear feedback shift registers (LFSRs), or multiple input signature registers (MISRs), as described by P. Bardell et al, in "Built-In Self Test for VLSI, Pseudo-random Techniques", John Wiley & Sons, 1987; or cellular automata (CA) as described by J. van Sas et al. in "Optimized BIST strategies for programmable data paths based on cellular automata", in Proc. Intl. Test Conf., 1992, pp. 110–119. In a similar manner, test responses are compressed in a register that is modified to form a signature analyzer. As described, for example by B. Koenmann et al., "Built-In Logic Block Observation (BILBO) technique", in Proc Intl. Test Conf., 1979, pp. 37–41, even though these structures may share some system registers, the circuit independent pattern generators and the signature analyzer are separate entities which contribute a high area overhead, and may cause significant performance degradation due to the addition of test logic on the system data path. Performance degradation may be unacceptable in the case of high-performance digital signal processing (DSP) circuits comprising high-speed data-paths.

Scan based BIST techniques have been used in the industry for several years, see for example, B. Nadeau-Dostie, S. M. Hassan and D. Burek, "ScanBist: A Multi-Frequency scan-based BIST Method", Proc. International Test Conference, Sept. 1992, pp. 506–513 and in U.S. Pat. No. 5,349,587 to Nadeau-Dostie, et al., describing scan testing of a digital system comprising a BIST core and a test access port conforming to IEEE 1149.1 test interface standard. These techniques utilize internal scan chains, on chip, to apply test patterns and collect responses. The dependency on the scan chain existence makes these techniques less attractive to high speed datapaths because of the performance impact associated with the scan. Even if performance impact is not an issue, the area overhead associated with the scan chain can be a major concern.

Typical high speed digital signal processing (DSP) systems, as used in telecommunications applications, primarily comprise regular arithmetic and logic blocks such as adders, subtractors, multipliers, shifters, and dividers. These blocks are interconnected in various configurations with register files, memories, multiplexors, and buses.

A self-testable digital integrator is described in U.S. Pat. No. 5,313,469 to Adham et al. The circuitry of the digital integrator which is used in normal operation to perform the integration function is used in test mode to generate a test pattern for testing the integrator and to compact test results.

In practice, a BIST technique is useful only if it provides high fault coverage (typically >95%), and known data path BIST schemes do not meet this criteria for application specific integrated circuits (ASICs) for Digital Signal Processing (DSP). Increasing the number of test patterns may increase the fault coverage, but at the same time fault aliasing increases too.

It has recently been shown that adder accumulator structures can be used to efficiently generate pseudo-exhaustive test patterns of high quality by simply accumulating a constant value, as discussed by S. Gupta, et al. in "Test pattern generation based on arithmetic operations", Proc. Intl. Conf. on CAD, 1994, pp. 117–124. Such structures can also be used as very effective test response compactors, e.g., as discussed in two articles by J. Rajski and J. Tyszer, "Accumulator-Based Compaction of Test Responses", IEEE Trans. on Computers, Vol. C-42, No. 6, pp. 643–650, June 1993 and "Test Response Compaction in Accumulators with Rotate Carry Adders", IEEE Trans. on CAD of IC, Vol. CAD-12, no. 4, April 1993, pp. 531–539. The accumulator-based compaction (ABC) scheme has negligible area overhead, no performance impact on the circuit-under-test and compaction properties comparable to that of LFSRs. These test capabilities of adder-accumulators have been utilized to develop an arithmetic BIST (ABIST) strategy for data-paths that eliminates the drawbacks of traditional BIST approaches for such circuits, and is described S. Adham et al. in "Arithmetic Built-In Self Test (ABIST) for Digital Signal Processing Architectures", In Proc. Custom Integrated Circuits Conf., 1995.

In the latter reference, accumulator operations were utilized to generate test patterns and compact responses for a typical datapath consisting of an arithmetic logic unit (ALU), a multiplier and register file. The entire test session was controlled using a microprogram stored in memory. Test patterns are not limited to the restricted signal spaces usually encountered in regular use. ABIST provides for testing at normal operational speeds, which is an advantage over the relatively slow scan BIST schemes. Two separate sets of registers in the register file were utilized to store the test generator and response compactor states. It was shown that this scheme could provide very high fault coverage after the application of only a few hundred test vectors. However, this solution suffers from an inability to sufficiently test the register file and relies on a sophisticated microprograms that are either stored in ROM or downloaded to RAM. Also, the effects of structures for non-linear operations like truncation and saturation logic, that are frequently found in DSP datapaths, are not considered.

SUMMARY OF THE INVENTION

The present invention seeks to provide a self-testable digital signal processor and an improved method for built in self test (BIST) of datapaths of integrated circuits for digital signal processing.

Thus according to one aspect of the invention there is provided an integrated circuit including a self-testable digital signal processor comprising:

a programmable data path comprising an arithmetic and logic unit (ALU), a register, and at plurality of logic blocks for digital signal processing (DSP) functions comprising non-arithmetic and non-linear functions, a multiplexor responsive to a test signal for switching the datapath between a first mode for normal operation of the digital signal processor, and a second mode for test operation of the digital signal processor wherein the ALU functions as a test pattern generator and a test data compactor, wherein a carry out bit of the ALU circulated back to the ALU as a carry in bit.

Thus, an self-testable digital signal processor is provided by a BIST scheme takes advantage of logic blocks in a DSP data path for generation of test vectors and compaction of test responses. The BIST scheme provides for efficient testing not only linear (arithmetic) logic blocks, but more significantly tests the non-linear structures in the datapath with a very high fault coverage. Also, the improved BIST scheme does not require a storage of a test program, as required for known arithmetic BIST (ABIST) schemes for testing DSP datapaths. This scheme is called Data Path BIST or DP-BIST.

The BIST session is controlled entirely in hardware without the need for a separate test pattern generation register or test program storage. Further, the BIST scenario is appropriately set-up so as to also test the register file as well as the non-arithmetic and non-linear functions, e.g. shift and truncation logic, in the data-path. The BIST solution enables a very high speed test (one test vector is applied per clock cycle) with no performance degradation and little area overhead for the hardware test control.

Indeed, since high-performance digital signal processing (DSP) circuits comprising high-speed data-paths consist primarily of arithmetic and logic blocks like adders, subtractors, multipliers, shifters etc., their powerful capabilities are therefore used for performing test functions, an approach that has been previously overlooked as sources of various test functions. The high area overhead and significant performance degradation due to the addition of test logic on the system data path is avoided. The DP-BIST scheme is applicable for applications in which the size of the product must be minimized without sacrificing performance.

According to another aspect of the present invention there is provided a method for built-in-self-testing of an ASIC comprising a digital signal processor characterized by a programmable data path comprising an arithmetic and logic unit (ALU), a register, and a plurality of logic blocks for digital signal processing (DSP) functions comprising non-arithmetic and non-linear functions, a multiplexor responsive to a test signal for switching the datapath between a first mode for normal operation of the digital signal processor, and a second (test) mode for test operation of the digital signal processor wherein the ALU functions as a test pattern generator and a test data compactor, and a carry out bit of the ALU circulated back to the ALU as a carry in bit, the method comprising:

a) initializing the circuit by steps comprising:
applying a test signal to initiate the teat mode enabling rotation of a carry out bit from ALU as a carry in bit;
initiating generation of test patterns through operation of the ALU as a pseudo random pattern generator; and b) applying said pseudo random test patterns to the datapath of the circuit;
reading the compressed signature of the circuit; and c) comparing the compressed signature to a non-faulty signature to determine a fault or no fault condition.

The use of the DataPath-BIST scheme enables a very high speed test, i.e. one test vector is applied per clock cycle, with no performance degradation and little area overhead for the hardware test control.

Advantageously, the circuit may include a block enable (BE) signal generator, and with the datapath in test mode, each of the logic blocks for DSP functions is switchable between two modes of operation responsive to a BE signal, i.e. between a first mode being for normal operation of the logic block for DSP functions, and a second mode in which the block becomes transparent to incoming data.

Figure 3:
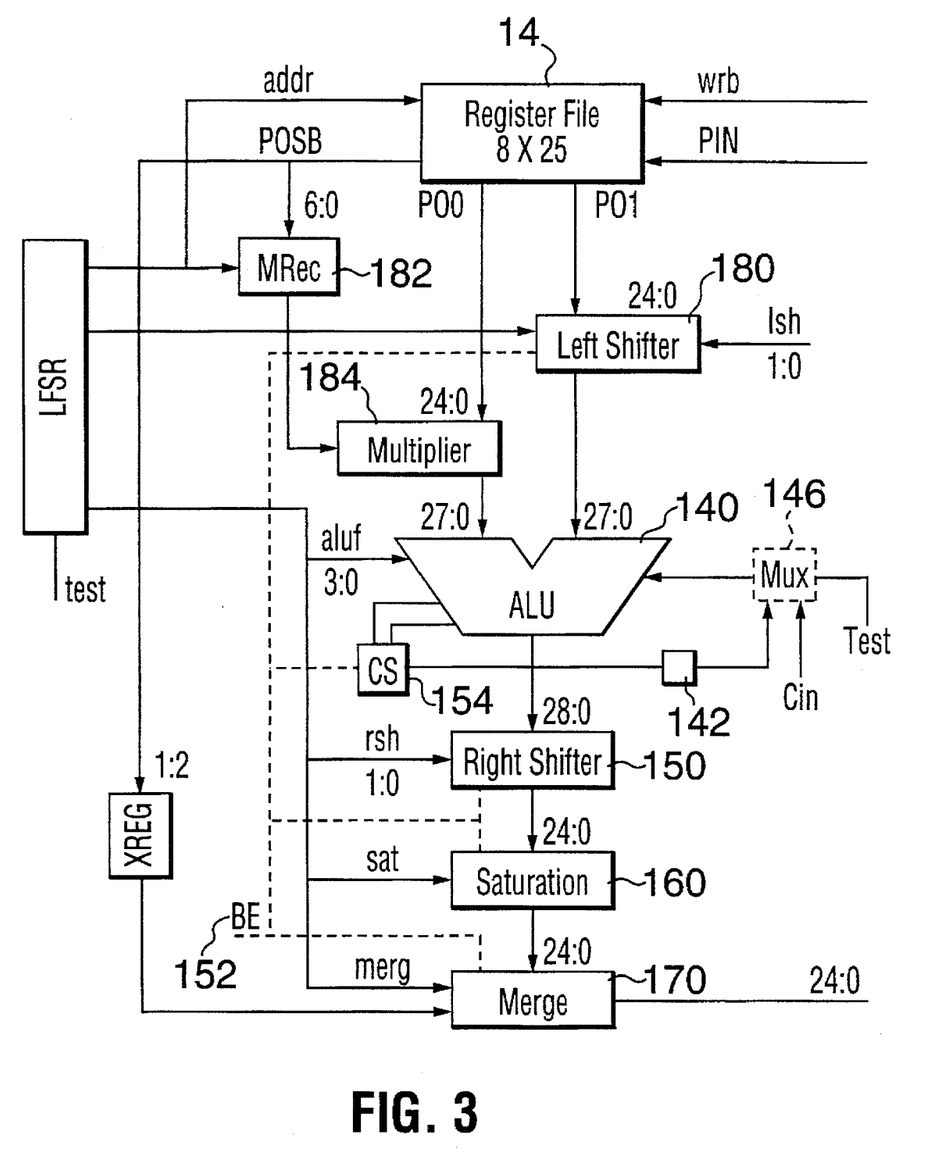
FIG. 3 shows a schematic block diagram of part of an ASIC comprising a self testable digital signal processor including the datapath for a two phase DP-BIST scheme according to a second embodiment of the present invention.

For example, to provide for two phase DP-BIST, the circuit is modified, so that the following datapath blocks have two modes of operation: Left Shift Logic (LSH), Saturation Logic (SAT), Right Shift Logic (RSH), and the Merge Logic (MERG). As shown in FIG. 3, a Block Enable (BE) control signal is used to switch between these two modes of operations. Forcing BE low (logic 0) causes the block to be transparent to the incoming data. BE high (logic 1) switches the block to normal operation. The ALU itself is not modified. However, when there is truncation, e.g. due to the ALU in combination with the left shift operation, two carry out signals are generated by the ALU, $C_L$ and $C_H$. $C_L$ is the carry from the low resolution bits (in this case $C_{out}25$) and $C_H$ is the carry from high resolution bits ($C_{out}28$). The BE control signal is used to arbitrate between the two signals, through the carry select block (CS).

The overhead due to these modifications to provide for two modes of operation is small. Significantly, the additional gates are not inserted in the path of the data, but in the control path, therefore having minimum impact on performance of the digital signal processor during normal operation.

Thus by modification of the circuit to provide for operation of the logic blocks in two modes, i.e. in normal mode and in a mode transparent to incoming data, the fault aliasing is significantly reduced.

In these schemes the control of non-linear operations is unique and achieved by hardware modifications. The method includes compressing the pattern and sending it back to the datapath, and stored programs are not required. The carry out bit control function is also unique in BIST schemes.

Beneficially, when the circuit includes a block enable signal generator, when the datapath is in test mode, the logic blocks of the datapath are switchable between two modes of operation, the first mode of operation being the normal operation mode and in the second mode of operation the logic blocks being forced transparent to input data, the method comprises testing in two phases:

in the first phase
generating a block enable signal to force logic blocks transparent to incoming data,
running a test for a specific number of clock cycles and generating a first signature, and reading the first signature and in a second phase generating a block enable signal and enabling all logic blocks in normal mode, running a test for a specific number of clock cycles and generating a signature, and reading the second signature.

Testing in two phases reduces the effects of fault aliasing by non-linear functions.

When the DSP functions include truncation, e.g. from the ALU in combination with a left shift, a carry select feature is enabled, the BE signal also operates to arbitrate between the low carryout bit $C_L$ and high carryout bit $C_H$.

Thus, the two phase DP-BIST scheme in particular ensures that the operation of the register file and/or other non-linear elements in the datapath do not affect test coverage, compared with conventional known BIST test methods.

The DP-BIST scheme may also be applied as a centralized test resource to test other macros on the chip, and the integration of DP-BIST with internal scan and boundary scan is addressed.

DETAILED DESCRIPTION OF THE EMBODIMENTS

Figure 1:
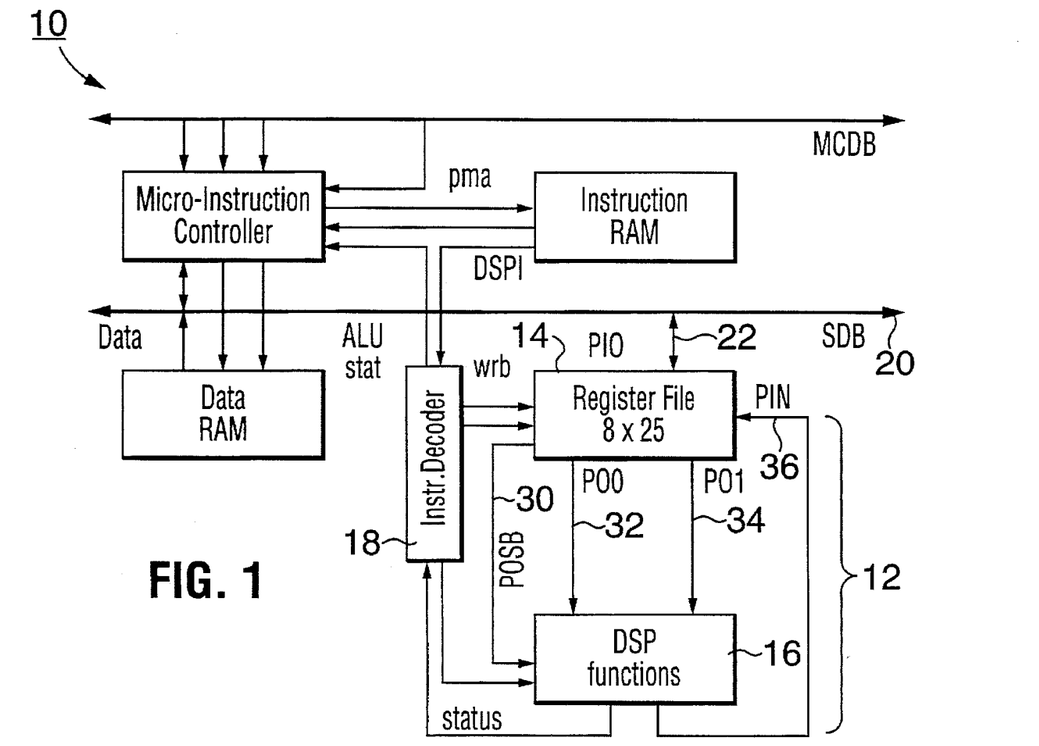
FIG. 1 shows a schematic block diagram of part of an application specific integrated circuit (ASIC) comprising a self-testable digital signal processor according to a first embodiment of the present invention.

Part of an integrated circuit 10 comprising a digital signal processor according to a first embodiment of the present invention, is shown schematically in FIG. 1. This diagram shows parts of the circuit that perform specific telecom functions and comprises a programmable datapath 12 having several DSP functional blocks; in particular FIG. 1 shows the main datapath and the register file 14 location in the DSP engine of the integrated circuit which comprises a DSP functional block 16, and instruction decoder 18. The structure is self-contained in one block that is custom designed to meet the required speed and chip area, this particular example being implemented in silicon technology.

The datapath accesses the Signal Data Bus (SDB) 20 bus through the register file PIO bus 22.

The register file 14 is a custom designed multi-port memory structure that has some specific properties. There are five ports: two write and three read plus a special port POSB 30 that is used for Booth multiplication decoding. Two read ports PO0, PO1 (32 and 34) are 25 bit wide read ports that can be addressed individually from the instruction decoder. The third read port is the PIO port 22 that is addressed by the instruction decoder 18 as a read/write port. The write read bit (wrb) signal is used to arbitrate between read and write access. The second write port is the PIN port 36 that is also addressed by the instruction decoder. The PIO port 22 has a higher write priority than the PIN port 36.

Register R0 in the register file 14 is always set to zero irrespective of the input value. Registers R1 to R6 are normal multi-port registers implemented in a custom static latch based memory. Register R7 has an extra bit (it is 26 bits wide 0:25) with the least significant bit (LSB) bit reserved for the shift right operation needed to achieve the multi-cycle modified Booth multiplication algorithm. A multiply signal is used to shift right the content of R7 by four bits.

The address decoders are implemented with dynamic logic.

Figure 2:
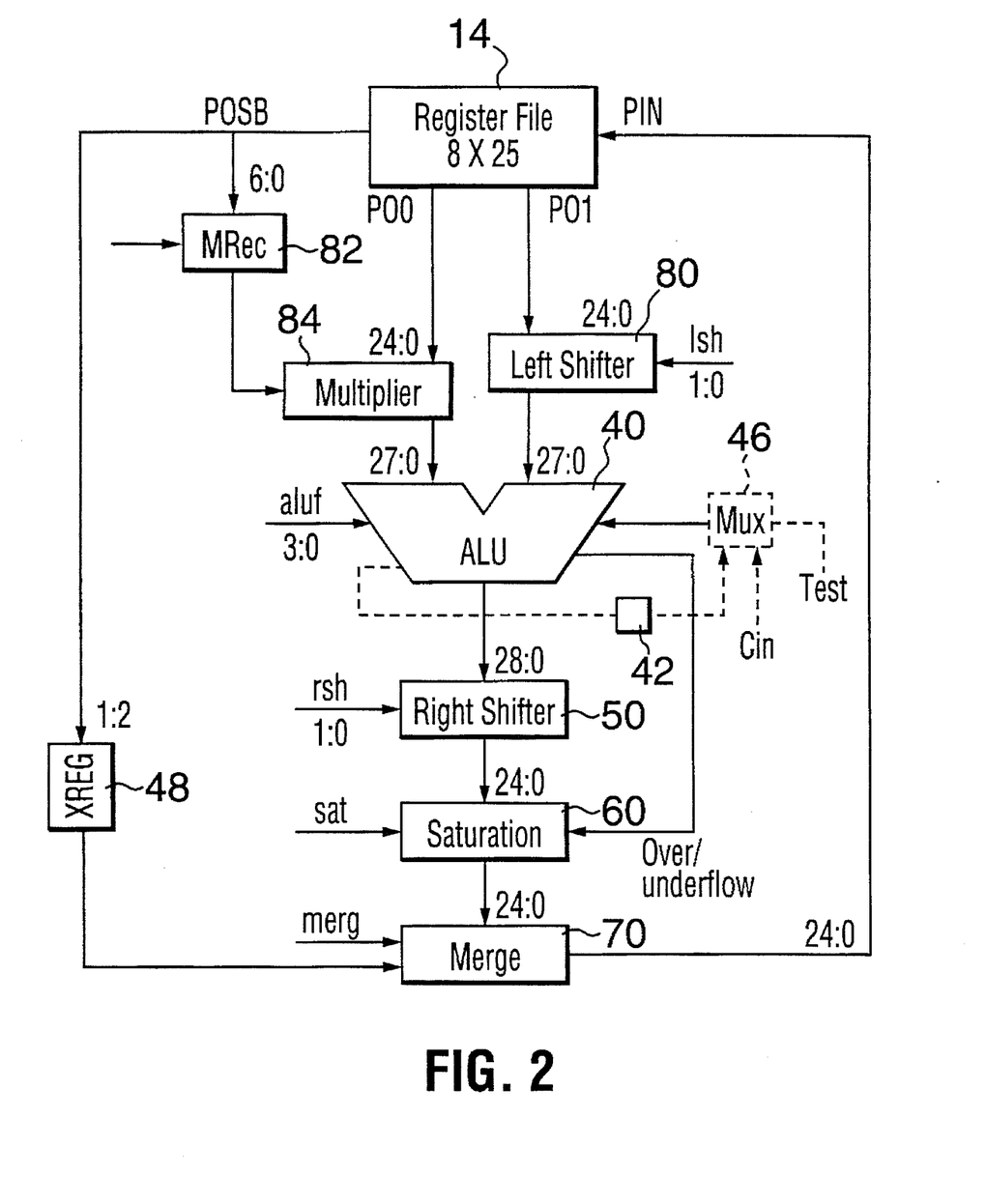
FIG. 2 shows part of the schematic block diagram of FIG. 1 in more detail including the datapath for a one phase DP-BIST scheme according to a first embodiment of the present invention.

An enlarged schematic of part of FIG. 1 is shown in FIG. 2 showing in more detail the programmable datapath 12. As shown, the DSP functional block 16 of FIG. 1 comprises an ALU 40 and other logic blocks 50, 60 and 70, 80, 82 and 84. Only a brief description of the individual macros is included in this application to highlight the issues that are relevant to random testing.

The ALUF (3:0) defines the operation of the ALU 40. There are 16 operations defined as necessary ones for the targeted DSP functions.

The barrel shift or Right Shift Logic (RSH) macro 50 has non-linear behaviour and directly impacts the fault coverage and fault aliasing. A 2's complement divide by 4, 16, and 64 controlled by RSH (1:0)

The Saturation Logic (SAT) macro 60 performs a threshold type of operation that turns the output to a maximum or minimum 2's complement number depending on the ALU operation and the ALU output. The SAT has non-linear behaviour if an overflow or an underflow has been detected by the ALU and the operation code ALUF (3:0) requires saturated output.

The XREG 48 contains two flip flops used to store the previous value of two bits in the register file. These bits are merged to the output depending on the DSP function.

Due to the Left Shift logic (LSH) macro 80, the internal resolution of the data path is larger than the external SDB bus width. In this example the internal resolution is 29 bits wide, with 25 bits external resolution.

The PIN port is not observable from the SDB bus 20. The datapath also comprises a multiplier recorder 82, a multiplier 84.

The use of a multiport register allows the ALU to read and write from/to different registers. During test mode, the register file is isolated from the PIO bus by forcing the WRB input to 0. The carry out bit is stored in a flip flop 42 to avoid timing problems.

To make the datapath self-testable some modifications are required to the interface to the instruction register and the SDB bus interface. The datapath includes DSP functions that do not map to arithmetic operations (e.g. AND, XOR). This may increase the probability of fault aliasing during the compaction process. We show the effect of such functions on fault aliasing using fault simulation experiments and show how to reduce the fault aliasing.

As described in the above referenced work by the present inventor, on accumulator based compaction (ABC) it is known that a fault tends to disappear from the accumulated value when it reaches the most significant bit. This causes the fault to be aliased. It was found that if the carry out bit of the adder is circulated back to the carry in, the probability of fault coverage drop decreases very significantly.

The datapath test schemes developed here are called DataPath BIST or DP-BIST.

Single Phase DP-BIST

A single phase DP-BIST scheme according to a first embodiment is described first with reference to FIG. 2. A test signal applied to the multiplexor 46 is used to switch the circuit between a first mode for normal operation of the circuit and digital signal processor (normal mode), to second (test) mode for test operation, i.e. BIST test mode. During BIST test mode, as mentioned above, the carry out signal from the ALU is rotated back as the carry in (dashed line in FIG. 2) The PIO port is set to read mode, and the ALU operates as a pseudo random pattern generator, i.e. is forced into pattern generation mode. Under this mode the PO1 and PIN ports of the register file have the same address.

The test session is then carried out in three stages, as follows:

In the first stage the register file 14 and the pseudo-random pattern generator, that is the ALU, are both initialized to a known (non-zero) value. A non-zero initialization of one register (in the register file 14) is sufficient for that purpose. Other registers can be reset to zero.

The second stage of the test session is to apply the a number of pseudo-random patterns to the initialized circuit. The WRB signal is forced LOW to inhibit the PIO port from writing to the register file, the test signal asserted and the clock is enabled for a number of cycles. The vectors generated by the random pattern generator (RPG) force random operation in the data path, thus generating random data which is written to the register file. The content of the register file is used to stimulate the datapath with new vectors, and so forth. The ALU acts as a compactor of the data because the carry rotate path is enabled during this stage.

The third stage of the test session is to read the compressed signature of the circuit and compare it to the non-faulty one. A mismatch between the two indicates a fault has been detected in the datapath. Usually, the signatures are stored Off-chip in host processor memory, to reduce the probability of faults in signature storage. Alternatively the test signature may be stored on-chip in a register.

The effectiveness of the single phase datapath BIST technique was examined using two attributes, namely the fault detection (before compaction) and fault coverage drop due response compression. Fault simulation experiments are carried out to evaluate these attributes as functions of Test Length (TL). Fault detection before compaction is calculated for every block in the datapath and the results are shown in Table 1. (In this example, all Stuck-At faults were simulated on a ZYCAD XP hardware accelerator.)

During the test session, the PIO of the register file 14 is disabled causing the fault detection of that block to drop. However, fault detection for other blocks are high, indicating that the patterns generated by the ALU are effective.

The effective fault coverage after compaction for the full fault set requires extensive amount of CPU simulation time. Thus, a sample of an arbitrary number of faults, i.e. 1325 faults, were used to calculate the fault coverage drop due to compaction for different numbers of test patterns.

Table 2 gives the percentage of faults aliased due to compaction. The expected fault coverage after compaction is equal the fault coverage before compaction reduced by the fault coverage drop due to, compression. For example, the effective test coverage of the register file for a test length of 2000 patterns would be 93.38%.

The results given in Table 2 show that the fault coverage drop due to fault aliasing during one phase BIST is significant, and increases with number of patterns applied. The reasons behind this are: the non-arithmetic logic (e.g. AND, OR) operations performed by the ALU; the saturation logic, the data merge operation, the right shift operations in the datapath; and the register R0 in the register file that is hard wired to zero.

To study the effects of these operations on the fault aliasing, several fault simulation experiments were performed in the Single Phase DP-BIST environment. Analysis of the simulation results shows that the major contributors to the fault coverage drop due to fault aliasing are the saturation, merge, right shift and the register R0. Contributions of the non-arithmetic operation of the ALU are negligible.

Two Phase DP-BIST

To reduce the fault coverage drop, further modifications on the blocks 50, 60, 70 that contribute to fault aliasing were made as described below as shown schematically in FIG. 3 which illustrates part of the integrated circuit showing the programmable datapath modified for two phase DP-BIST scheme according to second embodiment of the present invention, in which relevant logic blocks are modified to have two modes of operations, that is a normal mode of operation and another mode in which they are forced to be transparent to the incoming data. Thus, the fault aliasing by these blocks is reduced.

The blocks require testing in normal mode of operation also, so that in order to test the datapath effectively, it is necessary to run the BIST for the two modes of the datapath. Thus, this approach referred to as the two phase DP-BIST. To implement two phase DP-BIST modifications on the datapath preferably should not degrade performance or interfere with the custom design nature of the datapath.

For this reason, the ALU was not modified. Non-arithmetic logic operations are performed by the ALU. Thus, modifying the ALU to have two modes of operation would impose some performance penalty during normal operation. Modifying the register R0 in the register file, which is hard wired to logic ZERO, to be a normal register under test mode would mean changing the custom design of the datapath. Therefore, in this approach, we decided not to modify the ALU and the register file, to limit the impact of the BIST on the performance as well as the custom design of the datapath.

On the other hand, other datapath blocks including the shift and truncation logic blocks, can be modified without performance degradation or affecting the custom design of the datapath. For example, a right shift block can perform a divide by 4 (shift right 2 bits), 16 (shift right 4 bits), and 1 (no shift). Under the control of an input signal, the no shift operation can be forced with minor modifications to the control path.

Therefore, to provide for two phase DP-BIST, the circuit of the first embodiment was modified, so that the following datapath blocks have two modes of operation: Left Shift Logic (LSH) 180, Right Shift Logic (RSH) 150, Saturation Logic (SAT) 160, . and the Merge Logic (MERG) 170. As shown in FIG. 3, a BE (Block Enable) control 152 signal is used to switch between these two modes of operations. Forcing BE low (logic 0) causes the block to be transparent to the incoming data. BE high (logic 1) switches the block to normal operation.

The ALU 140 itself is not modified. However, due to the left shift operation 180, two carry out signals are generated, $C_L$ and $C_H$ by the ALU. $C_L$ is the carry from the low resolution bits (in this case $C_{out}25$) and $C_H$ is the carry from high resolution bits ($C_{out}28$). The BE control signal is also used to arbitrate between the two signals, through a carry selector (CS) function 154.

The overhead due to these modifications to provide for two modes of operation of each macro are 6 AND2 and a MUX only. Significantly, the additional gates are not inserted in the path of the data, but in the control path, therefore having minimum impact on performance of the digital signal processor during normal operation.

In implementation of two phase DP-BIST, the test is run in two phases, Phase I and Phase 2, to obtain two signatures, one for each control setting, with the blocks enabled in normal operating mode and in the other mode where they are transparent to test data.

After initiating the test mode, in phase I, the BE control signal is used to force the shift and truncation logic blocks that cause fault aliasing to be transparent to incoming data, i.e., disabled, the BIST is run for a number of clock cycles and a signature is read. After enabling all the non-linear blocks in the datapath, the BIST is run again for a number of clock cycles, and a second signature is read and carried out.

Figure 4:
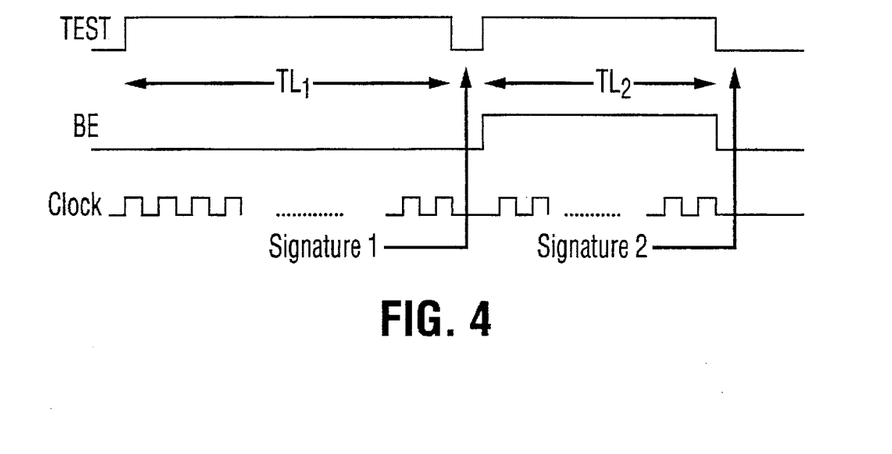
FIG. 4 shows a timing diagram for the two phase DP-BIST scheme shown in FIG. 3.

FIG. 4 shows an example of a timing diagram of the two phase DP-BIST where the BE control signal is used to control the test session. Testing the data path with the two phase BIST is accomplished by clocking the circuit for a number of cycles in both phases. However, the number of clocks (test length) in each phase needs to be determined.

Ideally Phase I test length ($TL_1$) can be very long since the most significant blocks that cause fault aliasing lo are disabled. However, running BIST for a large number of cycles does not guarantee that all faults will be detected in the data path. However, $TL_2$ has a higher effect on fault coverage drop than $TL_1$ since all blocks in the datapath are enabled.

The same attributes used to evaluate the single phase DP-BIST are used for the two phase DP-BIST. The only difference in this case is that there is a combination of two test lengths and two signatures.

Table 3 gives a summary of the fault coverage (before compaction) for the datapath model. The fault coverage is evaluated, for the different blocks in the datapath, for various combinations of $TL_1$ and $TL_2$.

Running fault simulation to find the fault coverage after compaction for the full set of faults takes too long. Therefore a practical approach is to run the simulation for the same arbitrary number, i.e. the 1325 set of faults. These results are shown in Table 4.

Clearly, for the two phase DP-BIST, the fault coverage drop due to compression is much lower than that for the single phase DP-BIST. In particular, during phase I of the BIST, the ALU performs logic operations as well as arithmetic ones, and the register R0 is active.

Thus, a self-testable digital signal processor is provided by a BIST scheme takes advantage of logic blocks in a DSP data path for generation of test vectors and compaction of test responses. The BIST scheme provides for efficient testing not only linear (arithmetic) logic blocks, but more significantly tests the non-linear structures in the datapath with a very high fault coverage. Also, the improved BIST scheme does not require a stored program, as required for known arithmetic BIST (ABIST) schemes for testing DSP datapaths.

The BIST session is controlled entirely in hardware without the need for a separate test pattern generation register or test program storage. Further, the BIST scenario is appropriately set-up so as to also test the register file as well as the shift and truncation logic in the data-path. The BIST solution enables a very high speed test (one test vector is applied per clock cycle) with no performance degradation and little area overhead for the hardware test control.

Indeed, since high-performance digital signal processing (DSP) circuits comprising high-speed data-paths consist primarily of arithmetic and logic blocks like adders, subtractors, multipliers, shifters etc., their powerful capabilities are therefore used for performing test functions, an approach that has been previously overlooked as sources of various test functions. The high area overhead and significant performance degradation due to the addition of test logic on the system data path is avoided. The DP-BIST scheme is applicable for applications in which the size of the product must be minimized without sacrificing performance.

This scheme results in compression of the test pattern and sending it back to the datapath without relying on stored test programs in traditional BIST schemes.

The use of the DataPath-BIST scheme enables a very high speed test, i.e. one test vector is applied per clock cycle, with no performance degradation and little area overhead for the hardware test control. The DP-BIST scheme may also be used as a centralized test resource to test other macros on the chip, and the integration of DP-BIST with internal scan and boundary scan is addressed.

Thus, the two phase DP-BIST scheme in particular ensures that the operation of the register file and/or other non-linear elements in the datapath do not affect test coverage, compared with conventional known BIST test methods.

Fixed Program DSP Data Path

Figure 5:
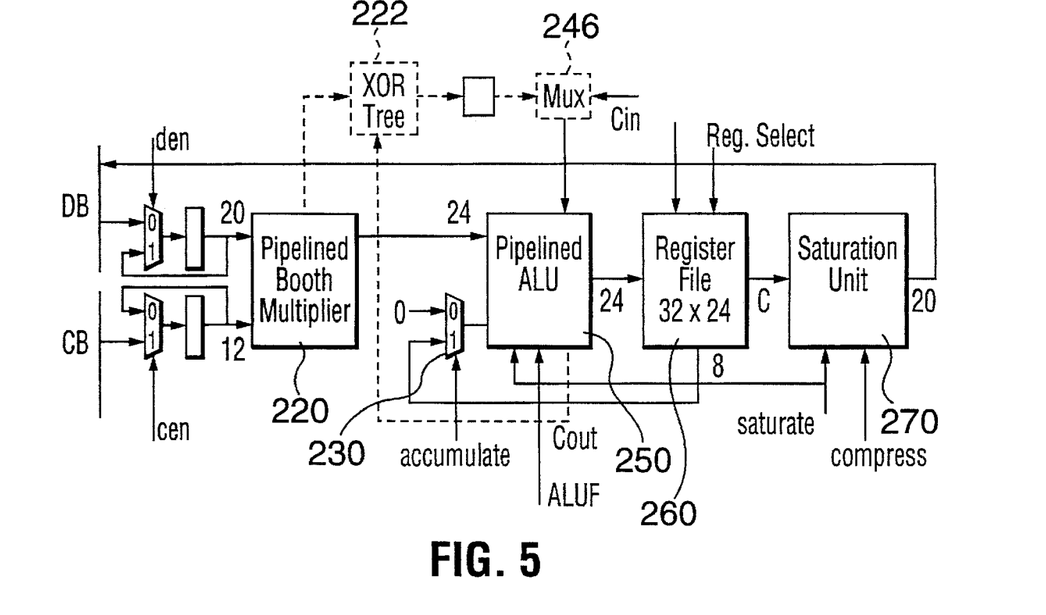
FIG. 5 shows a schematic block diagram of fixed program datapath for implementation of a Multiple Data Single Program MDSP DSP algorithm according to a second embodiment of the third invention.

In a self-testable digital signal processor according to a third embodiment, an ASIC comprising a digital signal functions comprises a second data path of a fixed program type as shown in FIG. 5. This circuit has a high performance data path unit that performs the arithmetic computations required to implement a typical Multiple Data Single Program (MDSP) DSP algorithm. As illustrated in FIG. 5, the data path consists of a Booth multiplier 220, an accumulator 230, a register file 260, and is heavily pipelined, using a pipelined ALU 250 to achieve the high throughput required, and a saturation logic block 270. Thus in contrast to the relatively small datapath of the first and second embodiments (FIGS. 2 and 3) having many DSP functions, the datapath of FIG. 5 is considerably larger in size with a fixed function.

Similarly to the previous case, modification to the datapath was carried out to ensure minimum fault aliasing. The 24 bits output of the multiplier is a truncation of the multiply operation. As illustrated by the dotted lines in FIG. 5, to avoid any fault aliasing due to truncation, an XOR tree 222 is added to the multiplier to propagate all detected faults from the truncated bits down stream. The one bit output of this XOR tree is again XORed with the carry out of the accumulator. The pipeline register in the control bus (CB) interface is modified to be configured into an linear feedback shift register or normal hold register.

Two phase DP-BIST is used for this case. After initializing the datapath by a test signal to the multiplexor 246, in phase I of DP-BIST mode the databus (DB) interface captures the output of the datapath by forcing the data enable signal den to logic 0; the control bus (CB) interface register is forced into the LFSR mode; the accumulate and the write enable (wen) signals are forced high; the saturate signal is forced inactive; a register driving the register select signal (Rag. Select) bus is made a free running counter; and the ALUF and the compress control signals are pseudo-randomly generated from an LFSR.

In phase two of DP-BIST the data enable (den) signal, accumulate, saturate, compress and ALUF signals are generated from an LFSR.

Table 5 shows the fault simulation results for the two phase DP-BIST of the datapath of the third embodiment after compaction for each block in the datapath for 3000 clock cycles (1500+1500). In this case, there were no faults aliased due to compression.

Comparison of DP-BIST and Scan Based BIST Technique

Scan base BIST techniques have been used in the industry for several years as noted in the above-mentioned references to Nadeau-Dostie et al. These techniques utilize on-chip internal scan chains to apply the patterns and Collect responses. The dependency on the existence of a scan chain make this approach less attractive to high speed datapaths, because of the performance impact associated with the scan chain. Moreover, even if the performance impact is not an issue, the area overhead associated with scan can be a major concern. In this section we present a comparative study between the area overhead of DP-BIST described herein, and the ScanBist technique in the latter reference.

The datapath of the circuit according to the third embodiment was chosen for the analysis. Three scan chains were inserted into the datapath. The scan chain insertion was carried out to maximize the use of the functional datapath for scan purpose, i.e. minimum orthogonal scan path insertion. The scan chains spans all blocks in the design including the register file. It was not necessary to modify the register file to be scannable since the function of the register file is a parallel FIFO. The FIFO function of the register file is utilized for scan operation and the Reg. Select counter was forced to run freely in ScanBist mode.

The number of gates in the of the original datapath (without scan) is 2540. The number of gates with scan chains inserted is 3115. This represents a 23% increase, corresponding to a very significant overhead in increased area. Without counting the area of the ScanBist controller/the scan paths routing and clocking constraints, it was clear that such an overhead is unacceptable.

In comparison, the total number of overhead gates of the DP-BIST scheme according to the third embodiment is 108 gates, a much more modest 4.25% increase, comprising 30 gates for the XOR tree; 9 for the flip flop and the MUX; 45 gates for modifying CB LFSR; and 24 gates for the ALU control LFSR.

DP-BIST Utilization

Providing a DSP ASIC having a self-testable datapath with minimum performance impact and low area overhead is an attractive alternative for testing such structure. On the other hand, accessing the BIST features, as well as controlling the BIST Session are other important factors that need to be addressed.

This section shows how the DP-BIST can be integrated with the existing scan methodology and using a Test Access Port(TAP) meeting the IEEE 1149.1 test interface standard.

The capability of employing the DP-BIST scheme to test other macros that reside on the chip is highlighted.

Integrating DP-BIST with the Scan and Boundary Scan

Figure 6:
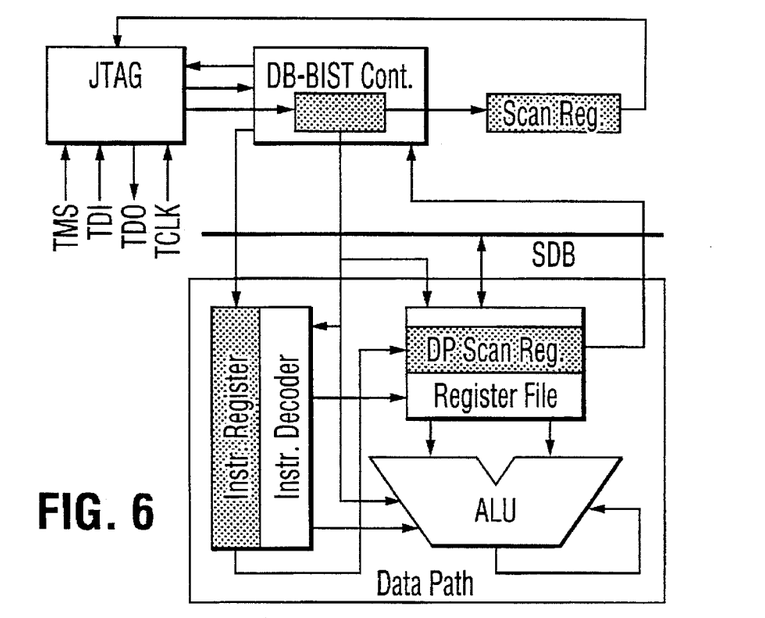
FIG. 6 shows an integrating DP-BIST scheme with scan according to a fourth embodiment of the present invention.

A self testable ASIC for DSP according to a fourth embodiment of the present invention, as shown in FIG. 6. The circuit includes a DP-BIST controller and scan register controlled through standard IEEE 1149.1 test access port (JTAG), and comprises a datapath comprising an ALU, and a Register file similar to that of the second embodiment and also including a scannable register, and an instruction decoder, associated with an instruction register.

The purpose of having one scannable register, in the register file, as shown in FIG. 6, is to facilitate the initialization of the register file. It is also used to scan the resulting signature for comparison purpose.

The DP-BIST controller circuit was tested as part of the scan chain of the chip through the JTAG port. The internal scan chain of the chip is also used to initialize the necessary register for correct DP-BIST operation. BIST is initiated from the JTAG port and the signatures can be either compared on-chip or shifted out through the JTAG port.

Modifications on the register file are not always required to achieve the compatibility with the scan technique. In an alternative embodiment (not shown) the DP-BIST scan register is a scannable shadow register residing outside the register file. At the end Of the BIST session the signature of the data path is copied to the shadow register.

Using DP-BIST to Test Other Modules on the Chip

Figure 7:
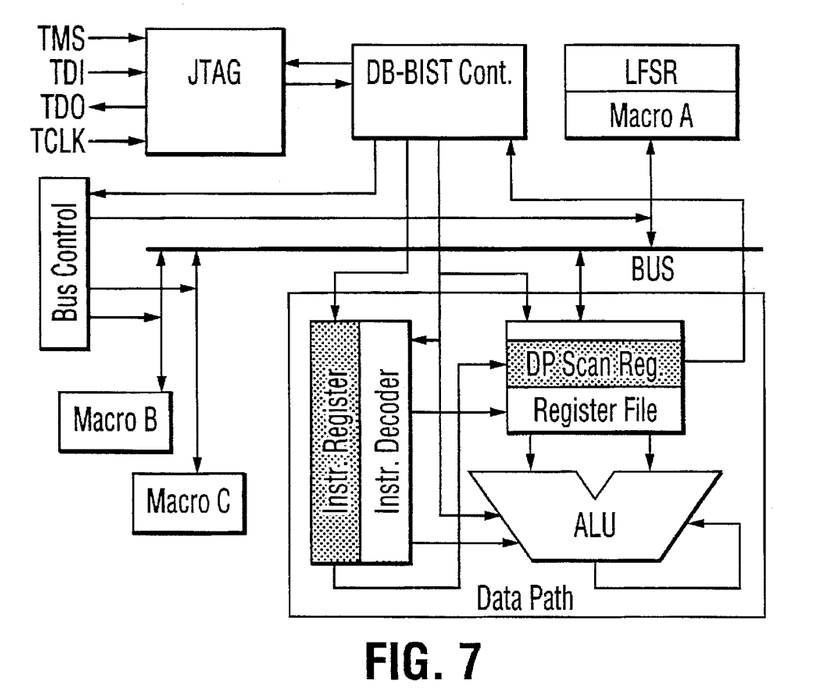
FIG. 7 shows a DP-BIST scheme for testing other macros on-chip according to a fifth embodiment of the present invention.

In an ASIC comprising a self testable digital signal processor according to a fifth embodiment of the present invention, as shown in FIG. 7, the structure allows for a DP-BIST technique to be utilized as a chip wide pattern generator and/or compactor. Chip macros are stimulated with pseudo-random patterns, either locally using an LFSR (Macro A) or from the DSP datapath (Macros B and C). The test responses are compressed using the ALU as a centralized compaction circuit.

For testing, the BIST controller assumes control of the BUS. The macros are tested one at a time by enabling the BUS interface (write) and starting the pattern generation process. The register file can store different signatures for each macro. Adding up these signatures in a carry rotate operation provides the signature of the whole circuit. The final signature is shifted out from the register file to the BIST core circuit for comparison. However, the signatures of the individual macros are also useful for fault diagnosis purpose.

Thus, novel BIST techniques suitable for high performance DSP datapaths are described. Two DP-BIST schemes are compared for their fault detection and fault coverage drop. The method of the first embodiment described above is a single phase BIST where the test is turned on for a number of clock cycles and a signature is read. Although this scheme requires no modification on the control of the datapath, compaction results in high fault coverage drop.

In the second embodiment described above a two phase BIST session is employed and minor modifications on the control of the datapath are performed. Simulation results show that the two phase BIST fault coverage drop, caused by the compaction, is one tenth that of the single phase BIST scheme. Furthermore, higher fault detection is achieved with the two phase BIST than the single phase BIST.

Thus, DP-BIST technique described above offers several advantages over traditional BIST schemes. The low area overhead needed to make the datapath self testable is an important feature. DP-BIST described above does not degrade the performance of the datapath. All the required hardware modifications are carried out on the control of the data path. This is important in high-speed application where the datapath is designed to take advantage of faster new technologies. Advantageously, the BIST is self-contained and avoids the requirement for test programs to be stored in the RAM or ROM.

Extensive fault simulation experiments show that the DP-BIST technique has very low fault aliasing and high fault detection capability even for a complicated datapath. Furthermore, if the BIST is run at the normal operating speed other faults (e.g. delay, stuck-Open, bridging, transition) can also be detected.

It has also been demonstrated how DP-BIST can be incorporated with the scan design methodology and accessed from a standard Test Access Port (TAP). Moreover, the technique can be used as a centralized on-chip resource to test other macros.

Applications of DP-BIST are not limited to these examples and use of DP-BIST may be extended for other custom designed self-testable DSP datapaths of different structure. Thus while particular embodiments of the present invention have been described in detail above, it will be understood that variations and modifications of the embodiments may be made within the scope of the following claims.

TABLE 1

Single Phase DP-BIST Fault Coverage (Before Compaction) for Different Values of Test Length

| Macro Name | TL = 1000 | TL = 2000 | TL = 3000 | TL = 4000 | TL = 5000 | TL = 6000 |
|---|---|---|---|---|---|---|
| LSH | 100% | 100% | 100% | 100% | 100% | 100% |
| RSH | 98.7% | 100% | 100% | 100% | 100% | 100% |
| MREC | 97% | 100% | 100% | 100% | 100% | 100% |
| BMUL | 95.7% | 95.9% | 96.7% | 97.7 | 97.9% | 97.9% |
| MERG | 100% | 100% | 100% | 100% | 100% | 100% |
| SAT | 100% | 100% | 100% | 100% | 100% | 100% |
| ALU | 93.9% | 97.7% | 97.8% | 98% | 98% | 98% |
| Register File | 92.7% | 94.3% | 94.3% | 94.3% | 94.3% | 94.3% |

TABLE 2

Single Phase DP-BIST Fault Coverage Drop Due to Compaction for Different Values of Test Length

| Test Length (TL) | #Detected (After Comp.) | #Detected (Before Comp.) | #Aliased (Due to Compression | % Coverage Drop |
|---|---|---|---|---|
| 1000 patterns | 1241 | 1244 | 3 | 0.25% |
| 2000 patterns | 1282 | 1294 | 12 | 0.92 |
| 3000 patterns | 1281 | 1296 | 15 | 1.1% |
| 4000 patterns | 1282 | 1299 | 17 | 1.3%. |
| 5000 patterns | 1274 | 1299 | 25 | 1.9% |
| 6000 patterns | 1272 | 1299 | 27 | 2.0% |

TABLE 3

Two Phase DP-BIST Fault Coverage (Before Compaction) for different combination of Test Lengths

| Macro Name | $TL_1 + TL_2$ 2000 + 2000 | $TL_1 + TL_2$ 3000 + 2000 | $TL_1 + TL_2$ 4000 + 2000 | $TL_1 + TL_2$ 5000 2000 | $TL_1 + TL_2$ 3000 + 1500 | $TL_1 + TL_2$ 4000 + 1500 |
|---|---|---|---|---|---|---|
| LSH | 98.9% | 98.9% | 98.9% | 98.9% | 98.9% | 98.9% |
| RSH | 100% | 100% | 100% | 100% | 100% | 100% |
| MREC | 100% | 100% | 100% | 100% | 100% | 100% |
| BMUL | 97.7% | 97.9% | 97.9% | 97.9% | 96.9% | 96.9% |
| MERG | 100% | 100% | 100% | 100% | 100% | 100% |

TABLE 3-continued

Two Phase DP-BIST Fault Coverage (Before Compaction) for different combination of Test Lengths

| Macro Name | $TL_1 + TL_2$ 2000 + 2000 | $TL_1 + TL_2$ 3000 + 2000 | $TL_1 + TL_2$ 4000 + 2000 | $TL_1 + TL_2$ 5000 2000 | $TL_1 + TL_2$ 3000 + 1500 | $TL_1 + TL_2$ 4000 + 1500 |
|---|---|---|---|---|---|---|
| SAT | 100% | 100% | 100% | 100% | 100% | 100% |
| ALU | 97.9% | 98% | 98.5% | 98.5% | 97.4% | 98.3% |
| Register File | 94.6% | 94.6% | 94.6% | 94.6% | 94.6% | 94.6% |

TABLE 4

Two Phase DP-BIST Fault Coverage (After Compaction) for different Combination of Test Lengths

| $TL_1 + TL_2$ | #Detec. | #Prev. Det. | #Aliased | % Aliased | % Coverage After Comp. |
|---|---|---|---|---|---|
| 2000 + 2000 | 1294 | 1297 | 3 | 0.23% | 97.6% |
| 3000 + 2000 | 1295 | 1298 | 3 | 0.23% | 97.7% |
| 4000 + 2000 | 1301 | 1305 | 4 | 0.3% | 98.1% |
| 5000 + 2000 | 1298 | 1305 | 7 | 0.5% | 97.9% |
| 3000 + 1500 | 1288 | 1291 | 3 | 0.23% | 97.2% |
| 4000 + 1500 | 1298 | 1302 | 4 | 0.3% | 97.9% |

TABLE 5

Fault Coverage of the BIST for the Datapath in Case 2

| Block Name | % Fault Coverage |
|---|---|
| Multiplier | 99.2% |
| Register File | 99% |
| ALU and Compress | 99.3% |

What is claimed is:

1. A integrated circuit including a self-testable digital signal processor comprising:

a programmable data path comprising an arithmetic and logic unit (ALU), a register, and a plurality of logic blocks for digital signal processing (DSP) functions comprising non-arithmetic and non-linear functions, a multiplexor responsive to a test signal for switching the datapath between a first mode for normal operation of the digital signal processor, and a second (test) mode for test operation of the digital signal processor wherein the ALU functions as a test pattern generator and a test data compactor, wherein a carry out bit of the ALU is circulated back to the ALU as a carry in bit.

2. A circuit according to claim 1 wherein the circuit includes a block enable (BE) signal generator, and in test mode, each of the logic blocks for DSP functions is switchable between two modes of operation responsive to a BE signal, the first mode being for normal operation of the block for DSP functions and in the second mode the block becomes transparent to incoming data.

3. A circuit according to claim 2 wherein the the ALU in combination non-linear logic functions causing truncation is operable to generate two carry out signals, where $C_L$ is the carry from the low resolution bits and $C_H$ is the carry from high resolution bits, and a carry selected function responsive to the BE control signal to arbitrate between $C_L$ and $C_H$.

4. A circuit according to claim 1 wherein the logic blocks comprise one of a left shift logic block (LSH), a right shift logic block (RSH), merge block (MERG) and saturation block (SAT).

5. A circuit according to claim 1 wherein the ALU is operable in the test mode as centralized compaction unit.

6. A circuit according to claim 1 wherein the DSP datapath provides a random pattern generator.

7. A circuit according to claim 1 wherein the DSP datapath is isolated from other parts of the circuit and comprises an instruction register modified to generate pseudo-random patterns in test mode.

8. A circuit according to claim 1 further comprising a BIST core controller and scan chain operable for combined datapath testing and scan testing.

9. A circuit according to claim 1 further comprising other logic blocks external to the programmable datapath, and operable in test mode for testing the other logic blocks.

10. A circuit according to claim 1 wherein test access is provided through a IEEE 1149.1 test access port.

11. A method for built-in-self-testing of an ASIC comprising a digital signal processor characterized by a programmable data path comprising an arithmetic and logic unit (ALU), a register, and a plurality of logic blocks for digital signal processing (DSP) functions comprising non-arithmetic and non-linear functions, a multiplexor responsive to a test signal for switching the datapath between a first mode for normal operation of the digital signal processor, and a second (test) mode for test operation of the digital signal processor wherein the ALU functions as a test pattern generator and a test data compactor, wherein a carry out bit of the ALU is circulated back to the ALU as a carry in bit, the method comprising:

a) initializing the circuit by steps comprising:
applying a test signal to initiate the test mode enabling rotation of a carry out big from ALU as a carry in bit, initiating generation of test patterns through operation of the ALU as a pseudo random pattern generator;

b) applying said pseudo random test patterns to the datapath of the circuit;
reading the compressed signature of the circuit; and c) comparing the compressed signature to a non-faulty signature to determine a fault or no fault condition.

12. A method according to claim 11 wherein the circuit includes a block enable signal generator, and with the datapath in test mode, the logic blocks of the datapath are switchable between two modes of operation, the first mode of operation being the normal operation mode and in the second mode of operation the logic blocks being forced transparent to input data;

the method comprising testing in two phases:
in the first phase:

generating a block enable signal to force logic blocks transparent to incoming data and running a test for a specific number of clock cycles and generating a first signature reading the first signature and in a second phase:

generating a block enable signal and enabling all logic blocks in normal mode;

running a test for a specific number of clock cycles and generating a second signature reading the second signature.

13. A method according to claim 12 wherein the ALU operates in combination with left shift logic operation generating two carry out signals, where $C_L$ is the carry from the low resolution bits and $C_H$ is the carry from high resolution bits, and controlling arbitration of the carry out bit between $C_L$ and $C_H$ by applying the block enable signal to a carry selector (CS).

14. A method according to claim 11 wherein testing is carried out at speed by applying one test vector per clock cycle.

15. A method according to claim 12 wherein testing is carried out at speed by applying one test vector per clock cycle.

16. A method according to claim 11 where the step of generating a random pattern comprises compressing the test pattern and sending it back to the datapath.

17. A method according to claim 12 where the step of generating a random pattern comprises compressing the test pattern and sending it back to the datapath.

18. A method according to claim 12 comprising testing the register file.

19. A method according to claim 11 wherein the circuit comprises other logic blocks external to the datapath and the method comprises testing the other logic blocks.

20. A method according to claim 12 wherein the circuit comprises other logic blocks external to the datapath and the method comprises testing the other logic blocks.

* * * * *